United States Patent [19]

Zehle et al.

[11] Patent Number: 5,487,605
[45] Date of Patent: Jan. 30, 1996

[54] PROCESS AND DEVICE FOR THE CONTINUOUS BLENDING OF LIQUID AND/OR POURABLE MATERIALS INTO FOODSTUFF MASSES

[75] Inventors: Gunter Zehle, Bergholz; Hubert Juhnke, Potsdam; Thomas T. Ismar, Köln, all of Germany

[73] Assignee: Ismar Maschinen GmbH, Cologne, Germany

[21] Appl. No.: 122,460

[22] PCT Filed: Mar. 30, 1992

[86] PCT No.: PCT/EP92/00705

§ 371 Date: Apr. 11, 1994

§ 102(e) Date: Apr. 11, 1994

[87] PCT Pub. No.: WO92/17069

PCT Pub. Date: Oct. 15, 1992

[30] Foreign Application Priority Data

Mar. 29, 1991 [DE] Germany ............ 41 10 416.1

[51] Int. Cl.⁶ .................................................. B01F 7/04
[52] U.S. Cl. .................................. 366/300; 366/319
[58] Field of Search ........................ 366/299, 300, 366/301, 318, 319, 321, 322, 325, 76, 83, 84

[56] References Cited

U.S. PATENT DOCUMENTS

| 2,611,590 | 9/1952 | Jebens | 366/301 |
| 2,630,302 | 3/1953 | Jones | 366/300 |
| 2,686,336 | 8/1954 | Kleinlein | 366/301 |
| 4,941,132 | 7/1990 | Horn | 366/300 |

FOREIGN PATENT DOCUMENTS

| 584306 | 11/1924 | France . |
| 2618643 | 2/1989 | France . |
| 1917435 | 11/1069 | Germany . |
| 401033 | 8/1924 | Germany . |
| 855017 | 11/1952 | Germany . |
| 939475 | 2/1956 | Germany . |
| 1180349 | 10/1964 | Germany . |

*Primary Examiner*—Robert W. Jenkins
*Attorney, Agent, or Firm*—Meltzer, Lippe, Goldstein, et al.

[57] ABSTRACT

A process and a device are disclosed for mixing-in liquid, pourable or lumpy substances into masses of foodstuffs, in particular foams or doughs. In order to ensure that neither the structure nor the form of the substances or of the foodstuff masses are modified during the mixing process, an elongated mixing container (1) contains at least two horizontal, spiral helices (4a, 4b) that turn in opposite directions, the diameters of which partially overlap without contact and the pitches of which are inclined in the direction of transport of the material to be mixed, so that a mixing section (4d), along which the substances can be mixed without pressure into the foodstuff mass, is formed between an input (9) and an output (3).

26 Claims, 3 Drawing Sheets

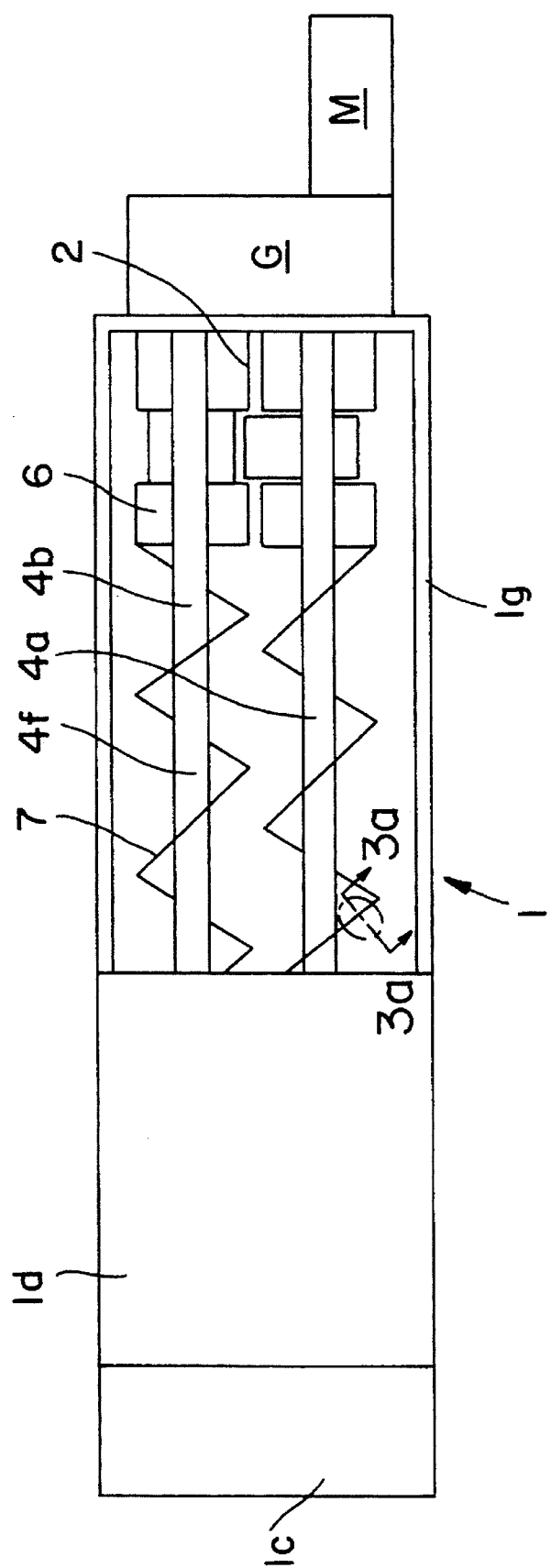

PROCESS AND DEVICE FOR THE CONTINUOUS BLENDING OF LIQUID AND/OR POURABLE MATERIALS INTO FOODSTUFF MASSES

The instant invention relates to a process for continuous blending, in particular for the blending of liquid, lumpy or pourable materials into basic foodstuff masses such as foam or dough. The invention furthermore relates to a device suitable for this purpose. The lump-free and uniform blending of pourable or lumpy substances into basic foam or dough masses is called "mixing".

A device to blend liquids and pourable materials is known from the German patent DE PS 21 13 960. In this device the shaft is made in form of a single hollow shaft and is provided with distributor pipes through which the liquid conveyed in the hollow space of the hollow shaft is admixed with the dry substances in the mixing chamber of the device. Another device is known from DE PS 96 36 88.

In this device the shaft is subdivided into several mixing segments which are differentiated by mixing elements that are installed at different distances from each other. The substances to be mixed can be fed into the mixing container of the device at the beginning of these zones via a filling opening. To improve the mixing results, counter-elements to the mixing elements in stator form are distributed in addition and are attached fixedly to the inner wall of the mixing container.

The known devices have the advantage that homogenous substance mixtures can be produced in a short time from liquid and dry substances by using them. Thus the high pressures produced in the mixing container during mixing and the shearing force which is thereby produced lead to a break-down of the dry substances and to the destruction of the structure of the liquids. In addition the substances are heated during mixing by the high application of energy, possibly causing a further undesirable change in the properties of the substance mixture. Furthermore it is not possible to achieve different degrees of blending in the individual substances when mixing different substances in these devices.

U.S. Pat. No. 3,064,908 discloses a mixing device which is used to suspend cellulose or pulp items in a carrier liquid. In this device counteracting helicoidal helixes rotating towards each other are provided by means of which the suspension is pressed against a housing wall so that liquid can be removed from a discharge valve installed below the helix arrangement as a result of the pressure produced.

FR 2,618,643 discloses a mixing device in form of a double worm extruder in which the additions are fed at filling points which are axially offset along the mixing line. In this device too, a high pressure is exerted upon the mix so that a great mechanical load is imposed upon the mix.

DE PS 401033 discloses a mixing or feed screw used to mix fine-grain materials. Here band-shaped screws are provided so that the material is thrown by one band-shaped screw into the circle of rotation of the other one and is pushed forward in increments while being mixed closely. Such a device is not suitable for the processing of foams or dough because only lumpy materials can be lifted up in the overlapping zone of the screws whereas non-lumpy substances do not participate in the mixing process.

The devices of the type mentioned above are therefore unsuitable for the production of substance mixtures where the structure and form of the original substances is to be preserved. This applies in particular to the production of baking dough, where liquid foam such as egg foam is to mixed with flour or starch and is to be blended with additional materials such as fruit, cacao, etc. The great pressure build-up during mixing in conventional devices leads to a compaction of the foam and to the destruction of the solid additional materials so that an undesirably tough dough mass is produced. In addition, egg foam can run because of the added heat so that the mixed baking doe becomes unusable.

It is the object of the instant invention to provide a process and to create a device such that liquid and dry substances can be mixed through with little energy consumption and using means of simple design, while preserving the structures and forms of the substances to a great extent.

This object is attained through the process in that the substance is introduced into a mixing container which receives the basic foodstuff mass and is open at the top and in that the mixing materials are conveyed horizontally in axial direction along a mixing line by means of at least two helicoidal helixes rotating in opposite directions, the cross-section of which is circular or oval and the diameters of which overlap in part.

The undesirable compaction of substances or of the basic foodstuff masses is reliably avoided by mixing the substances in a mixing container in which no pressure is build up. By using at least two screws rotating in opposite directions it is furthermore possible to achieve a high volume output in mixing with a low energy expenditure without having to use expensive conveying means. At the same time close yet gentle blending is achieved by using the "conveyor screws", since the added substances are so to say "lifted into" the basic foodstuff mass without themselves being destroyed or changed. The process according to the invention furthermore makes it possible to easily select the distance between the screws so that undesirably high pressure build-up in the mix can be reliably prevented.

The possibility of changing the location of the filling point of one substance in relation to the filling point of another substance according to a preferred embodiment of the invention makes it possible to easily achieve different degrees of mixing for different substances.

Especially gentle, structure-preserving blending can be achieved in that the original substances are pre-mixed in a first segment of the mixing line with the additional substances admixed in at least one downstream segment. Since the original substances are already pre-mixed when they are mixed with the additional substances, a homogenous substance mixture can be produced in a short time without additional stress being imposed on the substances added later. Dividing the mixing line into different segments has furthermore the advantages that the substances can be kneaded in a last zone of the mixing line with a greater pressure build-up than in the mixing container. This is especially advantageous when tough masses, e.g. bread doe is to be produced.

The device object of the invention is achieved by an oblong mixing container open at the top within which at least two horizontal helicoidal screws with circular or oval cross-sections and rotating in opposite directions are installed, their cross-sections overlapping in part without contact and their helicoidal pitch being inclined in the conveying direction of the mix, as well as by a filling point and a discharge point between which a mixing line is constituted along which the substance can be mixed into the basic foodstuff mass without pressure.

This produces an especially gentle blending of the substances. In addition the conveyor screws can be manufactured easily and at low cost since the additional mixing elements can be omitted. The conveying action of the conveyor screws is assisted through the fact that the pitch of adjoining conveyor screws have opposite rises due to their inclination in conveying direction. The conveying action of the conveyor screws can be determined here through the selection of the pitch of the screw threads.

Pressure build-up is reliably avoided inside the mixing container by its configuration as air that may be enclosed in the mixing container or excess mixing material can escape from the mixing container. Identical conveying direction of the shafts causes the mix to be conveyed from filling point to discharge point without any additional conveying devices. The screws rotating in opposite directions achieve here good and uniform blending of the substances.

Advantageous design features of the invention is the fact that the degree of overlap of the screw diameter is at least 20%, that the ratio between screw diameter and screw pitch is in the range of 1.0 to 2.0, and preferably 1.43, that the ratio between screw diameter and inside diameter of the mixing container is in the range of 0.1 to 0.8, and preferably 0.55 and in that the cross-section of the screw material is circular or oval.

When different substances are blended, the degree of blending can be controlled by filling the substances into the mixing container at different locations the positions of which can be changed over almost the entire length of the mixing container. This is possible due to the fact that the filling point can be moved axially along the mixing line.

Especially uniform mixing results can be achieved if the helicoidal screws are each supported by a driven shaft whereby the shafts of adjoining screws are axially parallel to each other. In this manner the degree of blending of the individual substances is especially easy to control because an even conveying speed occurs due to the axially parallel arrangement of the conveyor screws. In this case the blending action of the screws can be further improved in that the screw threads of the conveyor screws are connected to a central axle installed in the longitudinal axis of the conveyor screws by rods offset radially with respect to the axis of the conveyor screws or shafts by an angle value from the axis of the conveyors.

If substances with different firmness and stability or structure are to be blended together, it is especially advantageous for the conveyor screws to be subdivided axially into segments constituting different mixing sections. Thus it is possible to later mix substances which are to be blended thoroughly with additional energy with other substances which are too delicate for great mechanical stresses.

If dry substances are to be premixed, it is advisable for the conveyor screws to be provided with flat mixing elements placed perpendicularly to the axis of the conveyor screws to mix dry substances. Special so-called "paddles" are suitable mixing elements for this.

Spilling of excess mix can be prevented by making the mixing container tab-shaped. If the edges between the lateral walls of the screws and the bottom of the tab-shaped mixing container are rounded off, the blending movement of the mix is given additional assistance. It is especially advantageous in this case if the corners between the lateral walls and the bottom of the inside of the mixing container are rounded off. The rounded edges produce an especially even blending movement in the mix. This even blending movement can be further assisted through the centered attachment of a ridge in the intersection area on the floor of the mixing container and extending coaxially high the conveyor screw, whereby the free edges of said ridge is adapted to the outer contour of the conveyor screw. Especially advantageous mixing is achieved of the radius of the rounded corners and the radius of the contour of the ridge are equal to one half diameter of the conveyor screw. This ensures that the mix will be kept in constant, uniform movement.

The device can be further simplified by making the outlet point in form of an opening in the bottom of the mixing container, since gravity as well as the conveying movement of the mix can be used in this manner to fill a extraction container. In this case the filling of the extraction container can be further assisted in that the lateral narrow wall near the outlet point is bevelled to form a sliding surface for the mixed materials. The bevelled lateral wall at the end of the mixing line deflects the direction of movement of the mix to the outlet point. In the same manner, it is advantageous for the lateral narrow wall of the mixing container to be bevelled near the filling point to constitute a sliding surface for the substances.

An especially simple design of a device which is especially advantageous from the point of view of manufacturing costs is obtained if the conveyor screws are moved by a common drive. In this case the device according to the invention is especially well suited as a mixer for the production of baking doe or egg foam to which flour, starch or lumpy substances, e.g. cherries are to be added.

Another embodiment of the invention provides for the dosed addition of the liquid, pourable or lumpy substances as well as of the basic foodstuff masses through a combined volumetric/gravimetric dosage system.

The invention is explained in greater detail in drawings showing an embodiment.

FIG. 3 shows a top view of the device according to FIG. 1.

FIG. 3a shows an oval cross-section of the screws.

Figure 1:
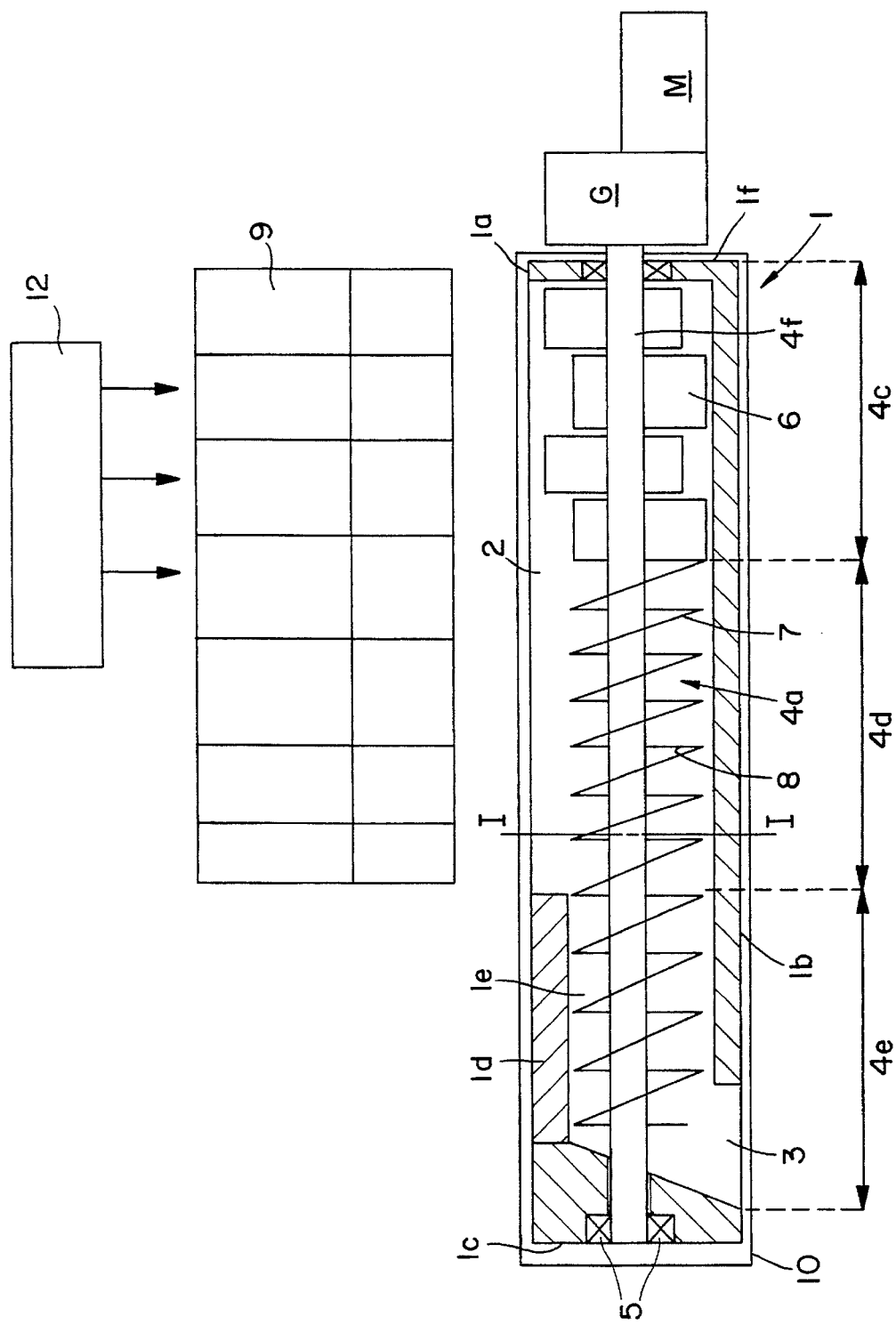
FIG. 1 shows a longitudinal section through the device.
Figure 2:
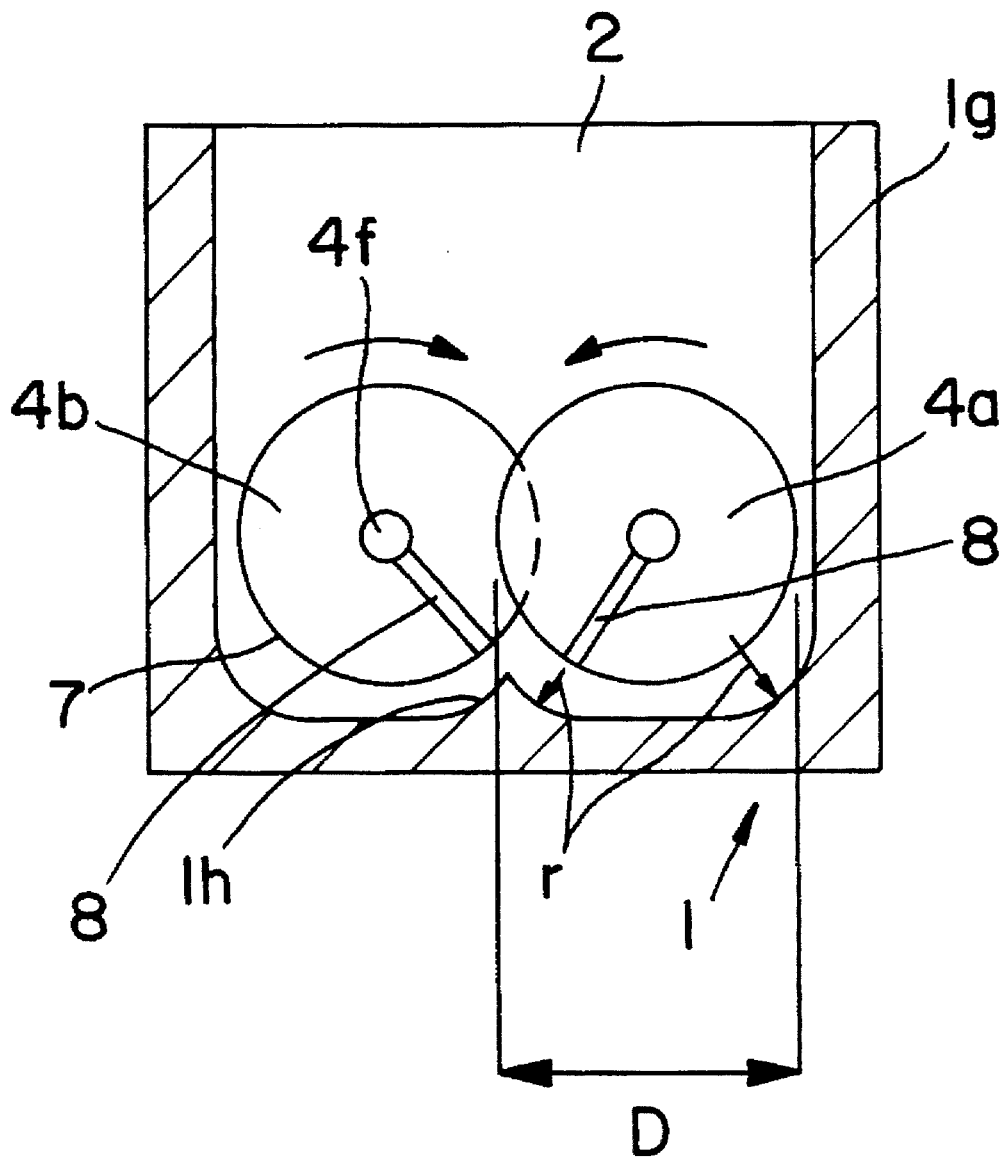
FIG. 2 shows a section along line I—I according to FIG. 1.

The device for the production of baking dough has a tub-shaped mixing container 1 at the top 1 of which a filling opening 2 extending over the entire length of the mixing container 1 is provided. An opening forming a discharge outlet 3 is made in the bottom 1b of the mixing container 1 and is offset in relation to the filling opening 2. A rear wall of the container interfaces with the discharge outlet 3. This rear wall 1c is bevelled so that it is narrow near the outlet opening 3 and has increasing thickness toward the top 1a of the mixing container 1. The rear wall 1c ends at the top side 1a in a closing plate 1d which interfaces with the filling opening 2. Between the closing plate 1d and the bottom 1b a kneading channel 1e is enclosed. The front wall 1f across from the rear wall 1c delimits the filling opening 2 at the front.

Parallel to the floor 1b and axially parallel to each other, conveyor screws 4a, 4b are installed in the mixing container 1 and are supported in bearings 5 in the front wall 1f and the rear wall 1c of the mixing container 1. The lateral walls 1g continue through a curve into the floor 1b on the inside of the mixing container, their radius r being equal to one half the diameter D of the conveyor screws 4a, 4b. Centered between the conveyor screws 4a, 4b a ridge 1h is formed on the bottom 1b, its free edges being also rounded off and having a radius r.

The conveyor screws 4a, 4b are subdivided into three mixing section segments 4c, 4d, 4. The first mixing section segment 4c extends from the front to approximately half of the width of the filling opening 2. The conveyor screws 4a, 4b are provided over this mixing section segment 4c with mixing elements 6 which extend two-dimensionally along axis 4f of the conveyor screws 4a, 4b and are made in form of paddles.

The conveyor screws 4a, 4b are provided with screw threads 7 throughout the second and third mixing section, said threads 7 sprialing spiral around a central axle 4f at a distance thereof and being pitched in the conveying direction. The screw threads 7 are connected to the central axle 4f by rods 8 which are perpendicular to the central axle 4f of the conveyor screw 4a, 4b. The third mixing segment section extends within the channel 1e which is enclosed within the top side 1d and the bottom 1b.

Above the top 1a the filling locations 9 extend over the width of the filling opening 2. The conveyor screws 4a, 4b are driven by a motor M and put into opposite motion via a gearing G.

Dry baking ingredients are filled into the mixing container 1 through the filling locations 9 in the area of the first mixing section 4c and are blended by mixing elements 6. In this process they are conveyed out of the first mixing section 4c to the second mixing section 4d. The liquid ingredients such as egg foam are poured into the mixing container in the area of the second mixing section 4d through filling locations 9. There they are blended with the pre-mixed dry baking ingredients and are at the same time conveyed to the third mixing section 4e which is designed as the kneading section. During blending in the first and second mixing sections 4c, 4d no pressure against the housing is built up in the mix because of the open filling opening 2. Only when the mix has been conveyed into the channel 1e does the pressure rise in the mix and the mix is kneaded into a homogenous dough mass until it finally reaches the outlet point and is conveyed along the bevelled rear side 1c of the mixing container 1 out of the mixing container and into an extraction container which is not shown.

If the device according to the invention is to be used only as a mixer in which the mix is blended without pressure build-up, the closing plate 1d can be removed for this so that all build-up of pressure against the mixing container 1 of the device is avoided even in the last mixing area. If no pre-mixing of the dry ingredients is to take place, it is also possible to use screw threads instead of the mixing elements 6 in the area of the first measuring section 4c on the conveyor screws 4a, 4b.

The dosage of the ingredients and that of the basic foodstuff masses is carried out by means of a combined volumetric/gravimetric dosage system 12. Each storage container for the respective ingredient is connected for that purpose to a dosage pump the rotational speed of which is controlled by a control circuit. The dosage pump feeds one filling location 9 at the top of the filling opening 2. The control circuit receives a signal representing an input magnitude (desired value) which is derived from a scale on which the storage container considered rests.

Depending on the actual amount removed from the supply container as ascertained by the scale (gravimetrically), the rotational speed is modified so that the (volumetric) conveyed quantity moved from the storage container into the filling locations 9 is constant.

When the scale detects that the minimum fullness condition in the storage container has been reached, the last updated rotational pump speed is maintained until the storage container is again filled. The storage container is filled through a separate added-dosage system and is terminated when the scale detects that the maximum full condition has been reached.

FIG. 1 shows the mixing container 1 surrounded by a housing 10 which is filled with an inert gas, e.g., nitrogen, at low pressure, e.g., 0.05 bar.

We claim:

1. A process for continuous mixing of liquid, pourable, or lumpy substances into basic foodstuff masses said process comprising, introducing said substance into a mixing container which receives the basic foodstuff mass and rotating at least two helicoidal screws in opposite directions to convey a resulting mix horizontally in an axial direction along a mixing line, wherein each of said at least two screws has a circular cross-section and perimeters which overlap in part with perimeters of the other screws, and further comprising introducing different substances at different axial locations of the mixing line.

2. The process as in claim 1, further comprising, pre-mixing the basic foodstuff mass in a first segment of the mixing line and adding the substance in at least one segment downstream from said first segment.

3. The process as in claim 1, wherein each of said screws has an oval cross-section.

4. A device for the continuous mixing of liquid, pourable or lumpy substances into basic foodstuff masses, comprising an oblong mixing container within which at least two horizontal helicoidal screws are installed, each of said screws rotating in opposite directions, and having perimeters which overlap in part with perimeters of the other screws without making contact and screw threads which are pitched in the conveying direction of the mix, a filling point, a discharge point, and a mixing section located between said discharge point and said filling point along which the substance can be mixed into the basic foodstuff mass without using pressure, wherein a ratio between screw diameter and inside diameter of the mixing container is in a range between 0.1 and 0.8.

5. The device as in claim 4, wherein said screw perimeters overlap by at least 20%.

6. The device as in claim 4, further comprising, a ratio between screw diameter and screw pitch within a range of 1.0 to 2.0.

7. The device as in claim 6, wherein said ratio between the screw diameter and the screw pitch is about 1.43.

8. The device as in claim 4, wherein each of said screws has a circular cross-section.

9. The device as in claim 4 wherein said filling point can be displaced in a longitudinal direction with respect to the mixing container along the mixing line.

10. The device as in claim 4, further comprising, at least two driven shafts, each of said shafts supporting one of said screws, with the shafts of adjoining screws being axially parallel to each other.

11. The device as in claim 4, wherein said screws are subdivided axially into segments, each of which segments constitute different mixing sections.

12. The device as in claim 11, wherein a last segment of the screws which is next to the discharge point comprises a kneading section surrounded by a sheath.

13. The device as in claim 4, wherein said mixing container is open at the top.

14. The device as in claim 4, wherein said mixing container is surrounded by a housing containing an inert gas.

15. The device as in claim 14, wherein said gas is preferably nitrogen at a pressure less than about 0.5 bar.

16. The device as in claim 4 further comprising a ridge which extends coaxially with the screws and is formed centrally in the intersection area on a floor of the mixing container, wherein free edges of said ridge are adapted to the outer contour of the screws.

17. The device as in claim 4, further comprising, a combined volumetric/gravimetric dosage system in which dosed addition of said liquid, pourable or lumpy substances and the basic foodstuff masses takes place.

18. The device according to claim 4, wherein said device is used for fine dispersion of flour or starches in egg foam.

19. The device as in claim 4, wherein said device is used to mix four into doough.

20. The device of claim 19, wherein said dough is one of sweet or sour.

21. The device as in claim 4, wherein said device is used to mix lumpy substances into one of egg foam, biscuit or ice-cream masses.

22. The device of claim 21, wherein said lumpy substances comprise one of fruit, nuts or a combination thereof.

23. The device as in claim 4, wherein said ratio between the screw diameter and the inside diameter is about 0.55.

24. The device as in claim 4, wherein each of said screws has an oval cross-section.

25. The device as in claim 4, wherein said ratio is about 1.43.

26. A device for the continuous mixing of liquid, pourable, or lumpy substances into basic foodstuff masses, comprising an oblong mixing container within which at least two horizontal helicoidal screws are installed, each of said screws rotating in opposite directions, and having parameters which overlap in part with parameters of the other screws without making contact and screw threads which are pitched in the conveying direction of the mix, a filling point, a discharge point, and a mixing section located between said discharge point and said filling point along which the substance can be mixed into the basic foodstuff mass without using pressure, wherein a ratio between screw diameter and screw pitch is within a range of 1.0 to 2.0.

* * * * *